United States Patent
Ganor

(10) Patent No.: US 10,775,137 B2
(45) Date of Patent: Sep. 15, 2020

(54) UP-ARMOR KIT FOR BALLISTIC HELMET

(71) Applicant: A. Jacob Ganor, Kowloon (HK)

(72) Inventor: A. Jacob Ganor, Kowloon (HK)

( * ) Notice: Subject to any disclaimer, the term of this patent is extended or adjusted under 35 U.S.C. 154(b) by 80 days.

(21) Appl. No.: 15/919,449

(22) Filed: Mar. 13, 2018

(65) Prior Publication Data
US 2018/0335282 A1    Nov. 22, 2018

Related U.S. Application Data

(60) Provisional application No. 62/506,708, filed on May 16, 2017.

(51) Int. Cl.
| | |
|---|---|
| A42B 3/06 | (2006.01) |
| F41H 5/013 | (2006.01) |
| F41H 1/08 | (2006.01) |
| B32B 9/00 | (2006.01) |
| A42B 3/04 | (2006.01) |

(52) U.S. Cl.
CPC .............. *F41H 5/013* (2013.01); *A42B 3/06* (2013.01); *B32B 9/005* (2013.01); *F41H 1/08* (2013.01); *B32B 2437/04* (2013.01)

(58) Field of Classification Search
CPC .. A42B 1/041; A42B 1/12; A42B 1/04; A42B 1/045; A42B 1/00; A42B 1/06; A42B 7/00; A42B 1/043; A41D 8/40; A41D 20/00; A41D 2/46; A41D 2/00; A41D 44/08; A41D 23/00; A41D 13/115; A41D 15/00; A41D 7/008; A41D 13/0015; A41D 2200/20; A47K 10/02; A47K 3/127; A45C 13/1046; A45C 2009/007; A45C 3/10; A45F 3/04
See application file for complete search history.

(56) References Cited

U.S. PATENT DOCUMENTS

| | | | | |
|---|---|---|---|---|
| 3,871,026 | A | * | 3/1975 | Dorre ........................ F41H 1/06 2/410 |
| 4,048,365 | A | * | 9/1977 | Hoover ..................... B32B 7/02 428/215 |
| 4,760,611 | A | * | 8/1988 | Huet ....................... B32B 15/00 2/2.5 |
| 4,879,165 | A | * | 11/1989 | Smith ....................... B32B 7/02 428/212 |
| 5,349,893 | A | * | 9/1994 | Dunn ....................... F41H 5/04 2/2.5 |
| 5,880,042 | A | * | 3/1999 | Schuster ................... B32B 5/26 442/134 |
| 6,029,269 | A | * | 2/2000 | El-Soudani .............. A42C 2/00 2/2.5 |

(Continued)

Primary Examiner — Robert H Muromoto, Jr.
(74) Attorney, Agent, or Firm — Jenei LLC

(57) ABSTRACT

A modular ceramic armor applique assembly includes ceramic armor element(s) that attach to an outer surface of a ballistic helmet and are held in place by structured envelope(s) to provide protection from rifle-fired projectiles at muzzle velocity. The modular ceramic armor applique assembly includes layers of substrate(s) disposed in one or more locations selected from a group comprising: (a) between the one or more ceramic armor elements and the one or more structured envelopes; (b) between the one or more ceramic armor elements and the outer surface of a ballistic helmet; and (c) between the one or more ceramic armor elements and the inner surface of the ballistic shell.

16 Claims, 4 Drawing Sheets

(56) References Cited

U.S. PATENT DOCUMENTS

| | | | | |
|---|---|---|---|---|
| 6,363,539 B2* | 4/2002 | Tachi | A42B 3/06 | 2/410 |
| 6,389,594 B1* | 5/2002 | Yavin | F41H 5/0428 | 2/2.5 |
| 7,037,865 B1* | 5/2006 | Kimberly | B29C 70/60 | 264/103 |
| 7,276,458 B2* | 10/2007 | Wen | C23C 4/04 | 2/2.5 |
| 7,642,206 B1* | 1/2010 | Bhatnagar | B32B 5/26 | 442/135 |
| 8,628,857 B2* | 1/2014 | Simovich | C04B 35/563 | 428/446 |
| 8,887,312 B2* | 11/2014 | Bhatnagar | A42B 3/063 | 2/2.5 |
| 9,046,324 B2* | 6/2015 | Bergman | F41H 5/0421 | |
| 9,046,326 B1* | 6/2015 | Rothman | F41H 5/0485 | |
| 9,291,440 B2* | 3/2016 | Ardiff | F41H 5/0464 | |
| 9,696,122 B2* | 7/2017 | Bergman | F41H 5/0421 | |
| 10,145,655 B2* | 12/2018 | Rockenfeller | F41H 5/0471 | |
| 10,197,363 B1* | 2/2019 | Gamache | F41H 5/0492 | |
| 10,215,537 B2* | 2/2019 | Ganor | F41H 1/02 | |
| 10,234,243 B2* | 3/2019 | Ganor | B32B 5/024 | |
| 2001/0013140 A1* | 8/2001 | Tachi | A42B 3/06 | 2/411 |
| 2004/0147191 A1* | 7/2004 | Wen | C23C 4/04 | 442/135 |
| 2004/0216595 A1* | 11/2004 | Dickson | F41H 5/0464 | 89/36.02 |
| 2006/0252328 A1* | 11/2006 | Bingenheimer | B32B 5/12 | 442/180 |
| 2006/0269738 A1* | 11/2006 | Kimberly | B29C 70/60 | 428/323 |
| 2008/0264243 A1* | 10/2008 | Lucuta | F41H 5/0414 | 89/36.02 |
| 2010/0009159 A1* | 1/2010 | Kimberly | B29C 70/60 | 428/222 |
| 2010/0077911 A1* | 4/2010 | Simovich | C04B 35/563 | 89/36.02 |
| 2010/0260972 A1* | 10/2010 | Oda | C04B 35/575 | 428/156 |
| 2012/0186002 A1* | 7/2012 | Bhatnagar | A42B 3/063 | 2/412 |
| 2013/0298316 A1* | 11/2013 | Jacob | A42B 3/12 | 2/414 |
| 2014/0023805 A1* | 1/2014 | Greenhill | F41H 1/04 | 428/34.1 |
| 2014/0076139 A1* | 3/2014 | Bergman | F41H 5/0421 | 89/36.02 |
| 2014/0260933 A1* | 9/2014 | Ardiff | F41H 5/0464 | 89/36.02 |
| 2015/0268007 A1* | 9/2015 | Bergman | F41H 5/0421 | 89/36.02 |
| 2015/0268010 A1* | 9/2015 | Strauss | F41H 7/044 | 89/36.02 |
| 2016/0221303 A1* | 8/2016 | Jancar | B32B 5/245 | |
| 2016/0320162 A1* | 11/2016 | Whitney | F41H 5/023 | |
| 2017/0241747 A1* | 8/2017 | Ganor | B32B 5/024 | |
| 2017/0275742 A1* | 9/2017 | Ganor | C22C 38/14 | |
| 2017/0363393 A1* | 12/2017 | Ganor | F41H 1/02 | |

* cited by examiner

UP-ARMOR KIT FOR BALLISTIC HELMET

CROSS-REFERENCE TO RELATED APPLICATIONS

The present Application for Patent claims priority to U.S. Provisional Application No. 62/506,708, entitled "UP-ARMOR KIT FOR BALLISTIC HELMET," filed May 16, 2017, which is hereby expressly incorporated by reference herein.

BACKGROUND OF THE INVENTION

1. Field of the Invention

The present disclosure relates generally to appliqué armor and to anti-ballistic protective headgear. More specifically, this invention relates to applique armor kits which enhance the protective capabilities of lightweight anti-ballistic helmets.

2. Description of the Related Art

Armor Devices:

Ballistic helmets are generally used to arrest penetration and absorb the impact from firearm-fired projectiles and shrapnel fragments from explosions. Helmets are the most basic, fundamental component of armor, and are generally made from interwoven or laminated ballistic fibers, most frequently para-aramid (para-aramid®, E. I. DuPont de Nemours and Co., Wilmington, Del.) or ultra-high molecular weight polyethylene (Abbreviated "UHMWPE." Trade names include: Dyneema®, DSM Dyneema B. V., the Netherlands. SPECTRA SHIELD®, Honeywell International Inc., Morris Plains, N.J.)

Although they have many merits—including lightweight construction and durability sufficient to sustain the rough handling and usage incident to combat operations—the para-aramid and UHMWPE helmets in common use are not capable of stopping direct hits from rifle rounds. They are generally rated to the NIJ 0106.01 standard, Level II, which specifies that they must resist penetration from .357 SIG Magnum Jacketed Soft Point (JSP) bullets with a specified mass of 10.2 g (158 gr) and a velocity of 425 m/s±15 m/s (1395 ft/s±50 ft/s)—and from 9 mm Full Metal Jacket (FMJ) bullets with a specified mass of 8 g (124 gr) and a velocity of 358 m/s±15 m/s (1175 ft/s ±50 ft/s).

Some combat helmets are tested to a level equivalent to the NIJ's 0101.06 body armor Level IIIa standard, which specifies that they must resist penetration from .357 SIG FMJ Flat Nose (FN) bullets with a specified mass of 8.1 g (125 gr) and a velocity of 448 m/s±9.1 m/s (1470 ft/s±30 ft/s)—and from .44 Magnum Semi Jacketed Hollow Point (SJHP) bullets with a specified mass of 15.6 g (240 gr) and a velocity of 436 m/s±9.1 m/s (1430 ft/s±30 ft/s). No known helmets are rated to a higher standard.

In contrast, hard body armor is generally rated to the NIJ 0101.06 Level III standard, which specifies that it must resist penetration from 7.62 mm FMJ, steel jacketed bullets (U.S. Military designation M80) with a specified mass of 9.6 g (147 gr) and a velocity of 847 m/s±9.1 m/s (2780 ft/s±30 ft/s). As should be apparent, the Level III rating is vastly more difficult to attain than the IIIa rating, due to the much higher velocity threat. And, as should also be apparent, this ballistic standard is more relevant to wartime operations, as the rifle is, by a very large margin, the world's primary battlefield weapon for combat personnel.

Head wounds account for a disproportionate amount of fatal combat injuries. Casualty statistics from Operation Enduring Freedom show that there were significantly more head/neck injuries than there were thorax and abdomen injuries combined. What's more, head and neck wounds are generally more fatal than combat injuries to other areas of the body—for instance, to the extremities, where combat wounds are very rarely fatal.

Although shrapnel and fragment-induced injuries to the head are a significant issue and make up a considerable fraction of combat head injuries, a large proportion of fatal combat head injuries are due to high-velocity bullet penetration. This is borne out by numerous epidemiological studies.

In a review of Israeli battlefield casualties in the Lebanon War of the 1980s, it was noted that although the head (above the brow) makes up just 3% of the body's surface area, it sustained nearly 15% of all fatal bullet wounds. The head sustained just 6.6% of all fatal shrapnel wounds, which suggests that modern combat helmets protect more adequately against shrapnel threats but offer inadequate protection from aimed projectile threats. This is as per: Gofrit, O.N., Kovalski, N., Leibovici, D. et al., "Accurate anatomical location of war injuries: Analysis of the Lebanon warfatal casualties and the proposition of new principles for the design of military personal armour system." *Injury*. 1996;27(8):577-581.

A US review of the Vietnam war reached an identical conclusion. Its abstract states: "Analysis of data obtained from U.S. military personnel who received either a lethal or non-lethal brain or head wound in Vietnam indicate that: 1. Bullets caused more fatal brain wounds that did fragments. 2. Most bullet wounds were received at close range, 40.9 m average. Most fatal fragment wounds to the brain occurred at a very close range, 2.9 m average. 3. Clinically significant intracranial blood clots occurred in only 7% of all fatal brain wounds. Only one man with a non-fatal brain wound had an associated clot, 3.3%. 4. Helmets offered no protection against bullets but gave significant protection against fragments. 5. Men who sustained either fatal or non-fatal brain wounds became immediately militarily non-effective." This is as per: Carey M. E., Sacco W, Merkler J. "An analysis of fatal and non-fatal head wounds incurred during combat in Vietnam by U.S. forces." Acta Chir Scand Suppl. 1982;508: 351-6.

There are numerous accounts which suggest that the problem of military head wounds is getting worse. For instance, from a review of casualties from Operation Iraqi Freedom and Operation Enduring Freedom: "While historical head and neck injury proportions ranged from 16% to 21% (World War II, Korea, and Vietnam), the proportion of head and neck wounds in the current conflicts (30%) is significantly higher (p<0.0001). Concurrently, thoracic wounds decreased 13% from World War II and Vietnam (p<0.0001)." This is as per: Brennan J. A., Holt G. R., (Physician) R. W. Otolaryngology/head and Neck Surgery Combat Casualty Care in Operation Iraqi Freedom and Operation Enduring Freedom. Textbooks of Military Medicine. 2015.

Evidence also suggests that not only do current standard-issue military helmets offer minimal protection against rifle rounds at close range—they may, counter-intuitively, intensify the damage caused by those rounds. A German review of casualties who were struck in the head by rifle rounds while wearing helmets noted: "The study showed surprising results: in the majority of cases, the helmet does not protect the wearer, but instead intensifies the damage caused by the bullet. The reasons for this phenomenon are changes in the stability of the projectile and deformation of or damage to the bullet. All of these mechanisms result in the bullet striking the tissue with higher energy." This is as per: Missliwetz J, Wieser I. [Gunshot wounds of the head in soldiers wearing military helmets—general aspects and experiments and observations on the biomechanics and wound morphology]. Z Rechtsmed. 1989;102(1):41-54.

It must be emphasized that the front of the head, corresponding to the area over the frontal bone of the skull, sustained the vast majority of bullet wounds (over 70% in the Gofit et al. study) which suggests that this area in particular could benefit from more effective antiballistic protection.

This, too, is borne out by an analysis of Vietnam casualties. A Vietnam-era epidemiological review noted that "Although the head and face accounts for only 9% of the exposed body, wounds to these areas resulted in 39% of the combat deaths studied.

"A large proportion of these casualties were fully and properly clothed in protective armor, yet the small vulnerable parts of the face and neck were hit. Most of the missiles entered anteriorly." This is as per: Maughon JS. An inquiry into the nature of wounds resulting in killed in action in Vietnam. Military Medicine 1970; 135:8-13.

There is therefore, and quite clearly, a pressing need for combat helmets that can defeat the rifle rounds commonly encountered on the battlefield, usually from such cartridges as the 7.62×39 mm, 5.56×45 mm, 5.8×42 mm, 5.45×39 mm, 7.62×54 mmR, and 7.62×5 mm. Rounds fired from the aforementioned cartridges generally range in velocity from 2,200 feet per second (7.62×39 mm) to approximately 3,300 feet per second (5.56×45 mm SS109). Impact energies range from roughly 1,100 ft·lbf to 2,500 ft·lbf. The velocities and impact energies generated by rifle rounds far exceed—are, in some cases, more than double—those of the 9 mm and .44 magnum rounds that combat helmets are commonly rated to stop.

At the present time, there are no helmets or applique/up-armor kits for helmets that can defeat full-velocity, steel-core rifle rounds, such as the common, standard-issue 5.56× 45 mm M855 rifle round.

There is, therefore, a clear and pressing need for protective headgear that can resist penetration when struck by steel-core rifle rounds, which are standard-issue in all modern armed forces, and include the NATO 5.56×45 mm M855, the Russian 5.45×39 mm 7N10, and the Chinese 5.8×42 mm DBP10.

SUMMARY OF THE INVENTION

In one aspect, the present disclosure provides for a helmet appliqué kit comprising a structured envelope, a ceramic armor element contained therein, and optional frame components may be used to hold the armor and/or structured envelope in place. In addition, one or more optional substrates may be used, such as padding contained therein, between the ceramic article and the frame.

The present invention provides a means for combat helmets to defeat steel-core rifle rounds traveling at high velocities. What's more, it is relatively light-weight, removable, can scale to offer adaptable levels of coverage and protection, can directly support night-vision and other tactical equipment, and can fit multiple helmet designs and configurations.

In one or more embodiments, the appliqué/up-armor kit of the present invention would consist of two to three layers: A ceramic layer of 1-12 mm in thickness, preferably 2-10 mm in thickness, more preferably 5-8 mm in thickness; an envelope or frame of high-strength woven composite, preferentially of carbon-fiber reinforced epoxy; optionally, a thin layer of metal or padding behind the ceramic layer; optionally, a thin padding layer between the envelope and the ceramic layer.

The ceramic layer shall ideally be made of a ceramic material with a theoretical density of less than 2.65 grams per cubic centimeter, such as boron suboxide (B6O), silicon boride (SiB6), aluminum boride (AlB12), aluminum magnesium boride (AlMgB14), beryllium boride (Be2B or Be4B), sodium boron carbide (NaB5C), magnesium silicide (Mg2Si), doped or undoped polycrystalline boron (B), or boron carbide (approximately B4.3C-B10.36C).

In other manifestations of the present invention, the ceramic layer can be made of denser ceramics such as silicon carbide (SiC), silicon nitride (Si3N4), alumina (Al2O3), titanium boride (TiB2), titanium carbide (TiC), tungsten boride (WB4), cubic boron nitride (cBN), or other armor-grade ceramic materials known to those skilled in the art.

In further manifestations of the present invention, the ceramic layer can be made of ceramic-metal or ceramic-metalloid composites, often called "cermets." These include the reaction-bonded ceramics, which are porous ceramic preforms which have been infiltrated with liquid silicon, and thus densified as silicon reacts with the ceramic particles and forms either silicates or silicon carbide, along with a certain volume of solid silicon metal. This also includes cemented carbides, where ceramic carbide particles are brazed together with a metal binder, such as tungsten carbide-cobalt (WC-Co), and titanium carbide-nickel-molybdenum (TiC-Ni-Mo).

The aforementioned ceramic materials can, in certain manifestations of the invention, be reinforced with nanomaterials such as carbon nanotubes, graphene, boron nitride nanotubes, boron nitride nano-platelets analogous to graphene, and metal-chalcogenide nanotubes or nanosheets. Nanomaterial reinforcement has been shown to increase the hardness and fracture toughness of ceramic materials such as alumina and silicon carbide and can possibly reduce the density and weight burden associated with the use of those ceramic materials. Silicon carbide with 5% boron nitride nanotube reinforcement by volume is a particularly preferred ceramic composite.

Forming the ceramic article to shape can be performed thus: A scan can be taken of the exterior helmet shell, and a frame along with a ceramic part can be designed using CAD software to match the curvature of the shell. Molds from those CAD models can then be made, in graphite or other materials suitable for the production of ceramic parts, and these molds can be used for the sintering of the ceramic article of the present invention. There are numerous other production methods, however, which involve casting, and which are well-known to persons having ordinary skill in the art.

The ceramic strike face, coupled with the rigid para-aramid or ultra-high molecular weight polyethylene of which the combat helmet is made, serves to defeat incoming projectiles and shrapnel via multiple mechanisms, including the following: The incoming projectile's kinetic energy is transformed into plastic deformation of the projectile via shattering or erosion, brittle fracture of the ceramic, plastic deformation of the helmet shell, and heat.

The enveloping material or structured envelope of the present invention is ideally made of a high-strength carbon fiber composite, such as Toray T800. It can, however, be made up of standard-grade carbon fiber such as Toray T300, of rigid para-aramid, of e-glass or s-glass composites, of M5 fiber composites, of basalt fiber composites, of polypropylene thermoplastic composites such as Tegris® (Milliken & Co., Spartanburg, S.C.) or of other high-strength woven or unidirectional materials presently known to those skilled in the art. The frame's roles include increasing the multi-hit performance of the ceramic by confining the portions of the ceramic that are damaged upon impact, the mitigation of spalling upon impact, toughening the ceramic-containing parts so that they can be handled without excessive risk of damage, and allowing for easy attachment of the part to the helmet shell.

The enveloping material or structured envelope can be manufactured simply. For one instance: A mold designed to envelop the ceramic part can be made from the ceramic part itself, and manufacture can subsequently proceed on tools intended for the fabrication of plastic or composite parts.

To protect the ceramic article from damage due to rough handling, one or more layers of an impact-absorbing elastomer can be inserted between the ceramic and the frame, and between the ceramic and the helmet shell. In one or more embodiments of the present invention, the impact-absorbing elastomer is Impact Gel®, manufactured by Impact Gel Holdings of St. Ettrick, Wis. In other manifestations of the present invention, it may include latex foam, polyurethane foam, polypropylene foam, polyethylene foam, expanded polystyrene, or the like and may be used individually or in combination.

The appliqué kit can be attached to a helmet via the bolts that are standard on modern combat helmets. All this requires is the use of longer bolts. The kit can also be installed via the three-hole or one-hole bolt patterns that come standard on modern combat helmets for the attachment of night-vision optics and other optical devices. In this case, the optical devices would rest on top of the appliqué kit, which itself rests on top of the combat helmet shell. The appliqué kit can also be attached to the helmet shell via hook-and-loop fasteners, e.g., Velcro, snaps, straps, and adhesives.

The present invention also provides for a complete combat helmet that incorporates a removable ceramic outer-shell. In some embodiments of the present invention, this ceramic outer-shell is made and attached in the manners aforementioned.

Unlike existing helmet prototypes and designs for rifle-resistant helmets, which primarily utilize pressed ultra-high molecular weight polyethylene for their anti-ballistic component, the device of the present invention should prove better-suited for use on the modern battlefield. Ultra-high molecular weight polyethylene is suitable for defeating lead-core and certain mild-steel-core threats but is incapable of defeating projectiles with hardened steel cores, such as the common M855, M855A1, M80A1, and virtually all designated armor-piercing rounds. The aforementioned M855, M855A1, and M80A1 rounds are not designated "armor-piercing," but, when travelling at near muzzle velocities and at a direct angle of approach, will always defeat armor of reasonable thickness that relies solely upon ultra-high molecular weight polyethylene. In one or more embodiments, the ceramic design of the present invention, however, is capable of stopping all of those threats and more.

What's more, the design of the present invention should not interfere with the use of night vision equipment (NVG), ballistic visors, and other forms of tactical eyewear. To the contrary, the design of the present invention is intended for use in conjunction with night vision equipment and tactical gear.

Picatinny rails can be bonded or attached to all surfaces of the device of the present invention. Communications and target acquisition equipment can thereby be attached to the appliqué of the present invention.

BRIEF DESCRIPTION OF THE DRAWINGS

The various exemplary embodiments of the present invention, which will become more apparent as the description proceeds, are described in the following detailed description in conjunction with the accompanying drawings, in which.

DESCRIPTION OF THE REFERENCED NUMERALS

Figure 1:
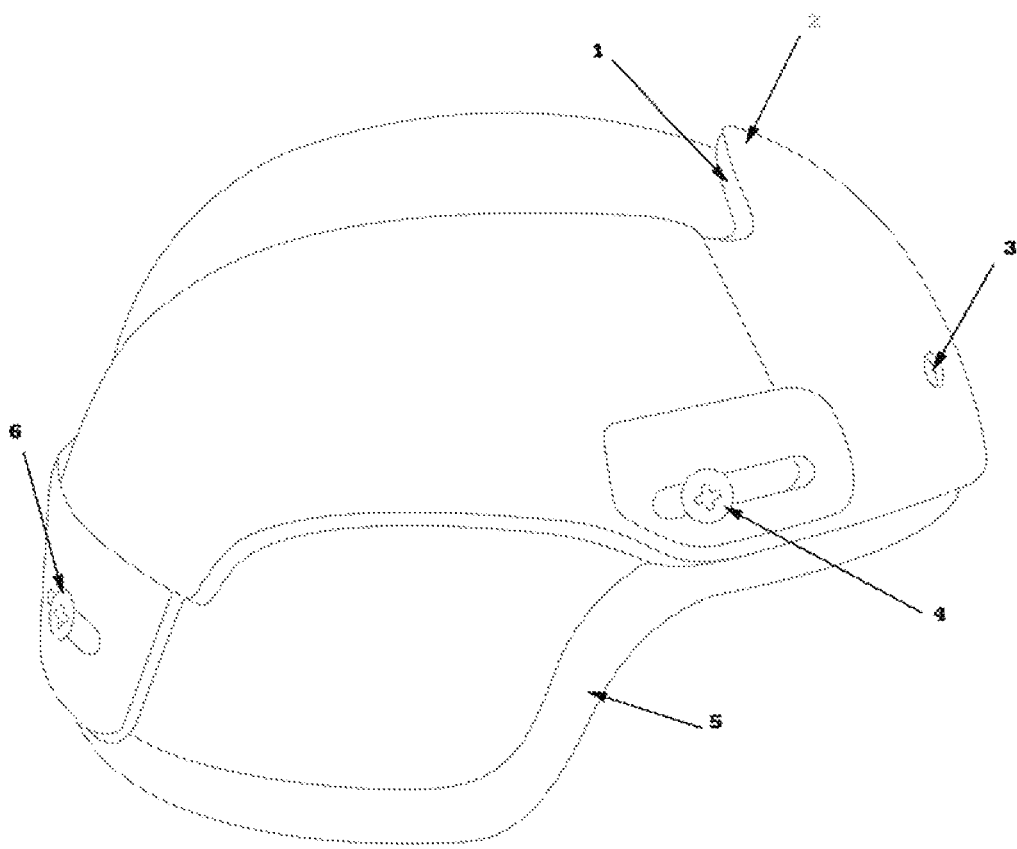
FIG. 1 illustrates a side view of one manifestation of the present invention.

In reference to the drawings, similar reference characters denote similar elements throughout all the drawings. The following is a list of the reference characters and associated element:
 ceramic armor layer 1
 external carbon fiber envelope 2
 hole for attachment of night vision or other tactical equipment 3
 slots 4
 helmet shell 5
 slot for attachment of armor appliqué elements 6
 three-hole pattern in the front 7
 top-tile 8
 bolt-hole 9
 rear plate 10
 side tile 11
 bolt-hole 12
 rear ceramic tile 14
 composite envelope 15
 helmet shell 17
 anti-ballistic protective headgear device 100
 helmet shell 110
 helmet retention system/harness 112
 ceramic armor elements 120, 130, 140, 150
 substrate 122, 132, 142, 152
 structured envelope 124, 134, 144, 154
 frame 126, 136, 146, 156,
 fasteners 128, 138, 148, 158

DETAILED DESCRIPTION

The present invention provides for materials and methods of making helmets that are comprised of a shell of aramid or ultra-high molecular weight polyethylene fibers. Such helmets are well-known and are the current standard for law enforcement and military use alike. The present invention, described herein, allows helmet wearers to quickly and efficiently affix lightweight ceramic armor panels to the exterior of their helmets, which subsequently offer protection from heavier threats, up to and including steel-cored rifle rounds traveling at over 3000 feet per second, e.g., the US Military's M855. The panels of the present invention are rapidly removable, offer modular and scalable coverage, and are engineered to fit multiple helmet designs. The present invention also discloses a helmet made using the materials and methods disclosed.

FIG. 1 depicts a side view of one manifestation of the present invention. It illustrates the ceramic layer 1, attached to an external carbon fiber envelope 2. The hole 3 is for the attachment of night vision or other tactical equipment. The slots 4 and 6 are for the attachment of the armor appliqué elements to the helmet shell 5. The woven nature of the external structured envelope and allows for its differentiation from the underlying ceramic.

Figure 2:
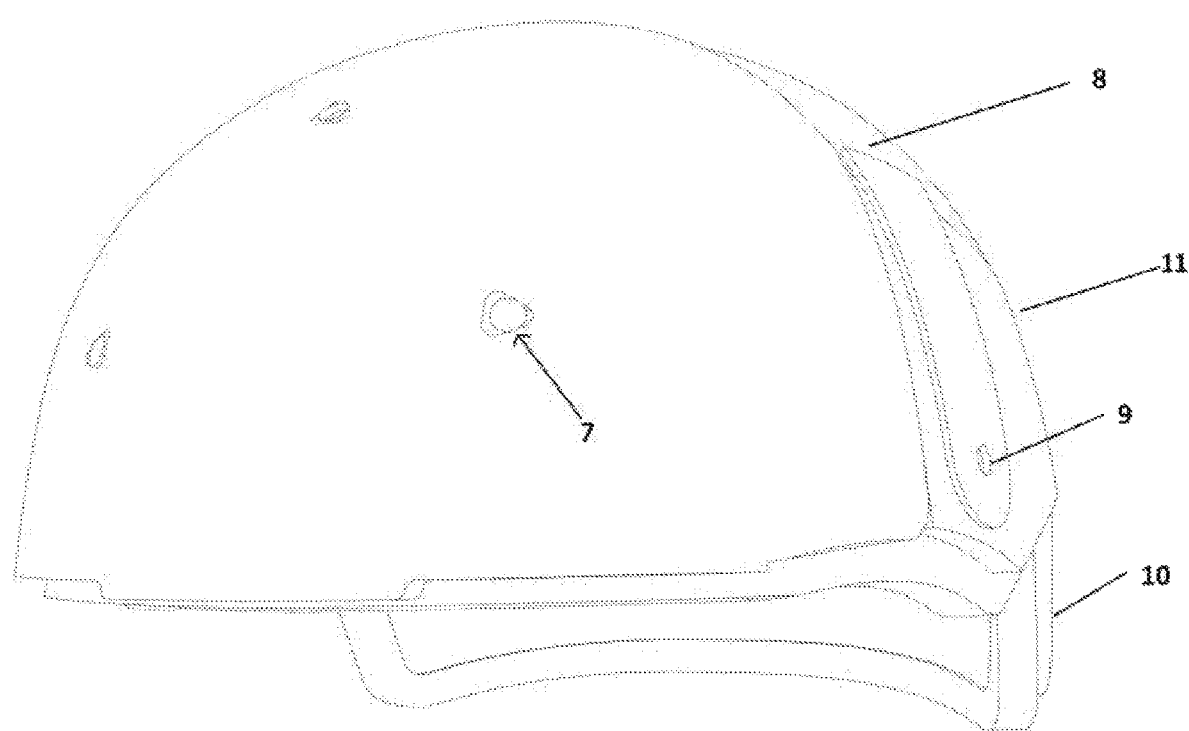
FIG. 2 illustrates a frontal view of a different manifestation of the present invention. In this design, the entire helmet shell is covered in ceramic tiles.

FIG. 2 depicts a frontal view of a different manifestation of the present invention. In this design, the helmet shell 5 is substantially covered in ceramic tiles. The frontal tile attaches to the helmet shell via the three-hole pattern in the front, indicated by 7, and there are no slots which project off the sides. The top-tile 8 and the side tile 11 attach via the bolt-hole at 9. In one or more embodiments of the invention, the rear plate 10 is shown at its location in the back of the helmet, where it would protect the wearer's occipital bone.

Figure 3:
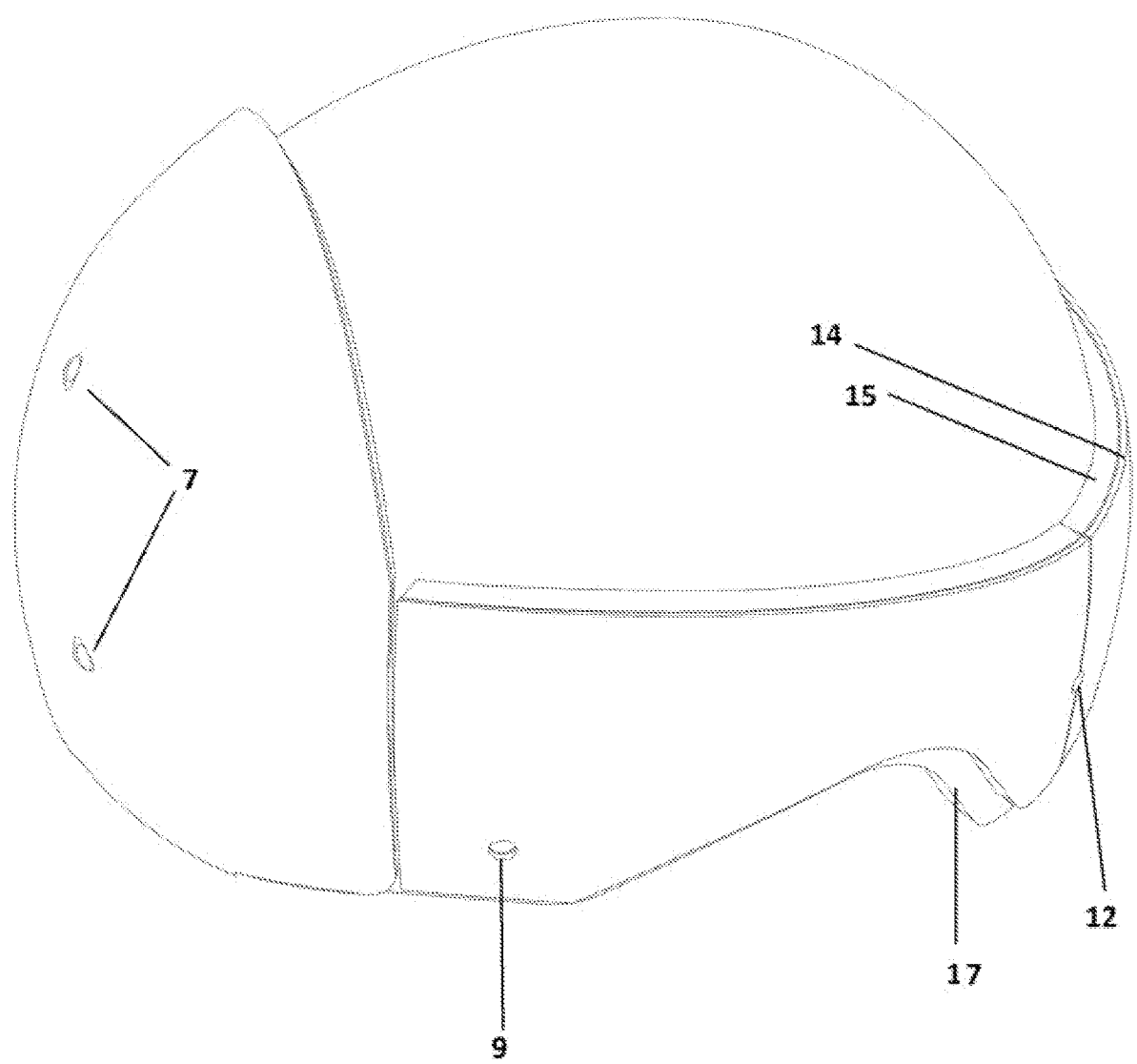
FIG. 3 illustrates an alternate view of the device as depicted in FIG. 2, but without the top ceramic armor tile.

FIG. 3 depicts a view of the device previously depicted in FIG. 2, but without the top ceramic armor elements or tiles. The attachment points for the frontal tile are again shown in 7. Bolt-holes 9 and 12 are utilized for the attachment of the side and rear ceramic armor parts. The composite envelope 15 covers the rear ceramic tile 14, which rests on the helmet shell 17.

In one or more embodiments, the present invention provides for an anti-ballistic protective headgear device 100. In one or more embodiments, the anti-ballistic protective headgear device 100 comprises a helmet shell 110, which is substantially covered in ceramic armor elements 120, 130, 140, 150.

In one or more embodiments, the modular ceramic armor appliqué assembly is configured to form a ballistic shell for attachment to the outer-surface of a ballistic helmet comprising (a) one or more ceramic armor elements and (b) one or more structured envelopes and; wherein the one or more ceramic armor elements are configured to attach to the outer surface of a ballistic helmet and held in place by the one or more structured envelopes; wherein the one or more structured envelopes are disposed to engage the ceramic armor elements and/or an outer surface structure of a ballistic helmet; and wherein the combination provides protection from rifle-fired projectiles at muzzle velocity when the assembly is combined with a ballistic helmet.

In another embodiment, the assembly comprises one or more layers of substrate disposed in one or more locations selected from the group comprising (a) between the one or more ceramic armor elements and the one or more structured envelopes; (b) between the one or more ceramic armor elements and the outer surface of a ballistic helmet; or (c) between the one or more ceramic armor elements and the inner surface of the ballistic shell.

In another embodiment, the one or more layers of substrate comprises metal, padding, rigid composite material, an impact-absorbing elastomer or combinations thereof.

In another embodiment, the assembly comprises one or more layers of an impact-absorbing elastomer substrate disposed between the ceramic and the frame, and one or more layers of an impact-absorbing elastomer disposed between the ceramic and the inner surface configured to engage an outer surface of a ballistic helmet.

In another embodiment, the ceramic armor elements are contained within structured envelopes comprising (a) a metal selected from the group consisting of: aluminum, magnesium, iron, titanium, beryllium, nickel, and alloys and mixtures thereof; (b) a rigid composite material selected from the group consisting of: woven carbon fiber composites, unidirectional carbon fiber composites, woven aramid composites, unidirectional aramid composites, woven M5 fiber composites, unidirectional M5 fiber composites, woven polypropylene fiber composites, unidirectional polypropylene fiber composites woven e-glass composites, woven s-glass composites and mixtures thereof; and (c) combinations thereof.

In another embodiment, the structured envelope is a woven fiber that envelops the one or more ceramic armor elements.

In another embodiment, the assembly attaches to the helmet shell's outer surface structure using one or more methods selected form the group consisting of metal screws or pins through small holes specially drilled into the assembly and helmet, hook-and-loop fasteners such as Velcro, the four bolt holes common to military helmets, the bolt holes drilled into the front of ballistic helmets, often in a one-hole or three-hole pattern, and combinations thereof.

In another embodiment, the ceramic material is (a) one or more materials selected from the group consisting of silicon carbide, boron carbide, boron suboxide, aluminum oxide, silicon nitride, silicon boride, aluminum boride, magnesium boride, potassium boride, yttrium boride, calcium hexaboride, sodium boron carbide, magnesium silicide, aluminum magnesium boride, beryllium boride, titanium carbide, titanium boride, tungsten carbide, tungsten boride, polycrystalline boron, cubic boron nitride, polycrystalline diamond and combinations thereof; (b) a ceramic-metal composite ("cermet") comprised of (i) a ceramic material selected from one or more of the following materials: silicon carbide, boron carbide, boron suboxide, aluminum oxide, silicon nitride, silicon boride, aluminum boride, magnesium boride, potassium boride, yttrium boride, calcium hexaboride, sodium boron carbide, magnesium silicide, aluminum magnesium boride, beryllium boride, titanium carbide, titanium boride, tungsten carbide, tungsten boride, polycrystalline boron, cubic boron nitride, and polycrystalline diamond; and (ii) a metal material selected from one or more of the following materials: silicon, aluminum, titanium, iron, magnesium, beryllium, scandium, chromium, zirconium, cobalt, nickel, germanium, molybdenum, copper, tungsten, manganese, and alloys of the aforementioned metals; and (c) combinations thereof.

In another embodiment, the ceramic material is a nanocomposite reinforced with boron nitride nanotubes, carbon nanotubes, graphene, or boron nitride nanosheets.

In one or more embodiments, the present invention provides for an anti-ballistic protective headgear device 100 comprising a ballistic helmet with a ceramic-based anti-ballistic appliqué assembly attached to an outer surface structure of the ballistic helmet.

In another embodiment, the ballistic helmet is primarily comprised of composite fibers, such as para-aramid, ultra-high molecular weight polyethylene, polypropylene, carbon fibers, metals and metal alloys and combinations thereof.

In another embodiment, the ceramic armor elements are contained within (a) one or more frames or envelopes, which are comprised of a metal selected from the group consisting of: aluminum, magnesium, iron, titanium, beryllium, nickel, and alloys and mixtures thereof; (c) one or more frames or envelopes, which are comprised of a rigid composite material selected from the group consisting of: woven carbon fiber composites, unidirectional carbon fiber composites, woven aramid composites, unidirectional aramid composites, woven M5 fiber composites, unidirectional M5 fiber composites, woven polypropylene fiber composites, unidirectional polypropylene fiber composites woven e-glass composites, woven s-glass composites and mixtures thereof; and (c) combinations thereof.

In another embodiment, the assembly attaches to the helmet shell using one or more method selected from the group consisting of (a) one or more metal screws, bolts, or fastening pins, through small holes specially drilled into the helmet; (b) Velcro; (c) the four bolt holes common to military helmets, typically utilized for the attachment of the helmet retention system or harness; and (d) bolt holes drilled into the front of the ballistic helmet also used to allow for the attachment of optics, night vision, and other tactical equipment to the helmet.

In another embodiment, the ceramic armor elements are 2 mm or greater in thickness. In another embodiment, the woven fiber frame envelops the ceramic armor element.

In another embodiment, the ceramic material is (a) one or more materials selected from the group consisting of silicon carbide, boron carbide, boron suboxide, aluminum oxide, silicon nitride, silicon boride, aluminum boride, magnesium boride, potassium boride, yttrium boride, calcium hexaboride, sodium boron carbide, magnesium silicide, aluminum magnesium boride, beryllium boride, titanium carbide, titanium boride, tungsten carbide, tungsten boride, polycrystalline boron, cubic boron nitride, polycrystalline diamond and combinations thereof; (b) a ceramic-metal composite ("cermet") comprised of (i) a ceramic material selected from one or more of the following materials: silicon carbide, boron carbide, boron suboxide, aluminum oxide, silicon nitride, silicon boride, aluminum boride, magnesium boride, potassium boride, yttrium boride, calcium hexaboride, sodium boron carbide, magnesium silicide, aluminum magnesium boride, beryllium boride, titanium carbide, titanium boride, tungsten carbide, tungsten boride, polycrystalline boron, cubic boron nitride, and polycrystalline diamond; and (ii) a metal material selected from one or more of the following materials: silicon, aluminum, titanium, iron, magnesium, beryllium, scandium, chromium, zirconium, cobalt, nickel, germanium, molybdenum, copper, tungsten, manganese, and alloys of the aforementioned metals; and (c) combinations thereof.

In another embodiment, the ceramic material is a nanocomposite reinforced with boron nitride nanotubes, carbon nanotubes, graphene, or boron nitride nanosheets.

Figure 4:
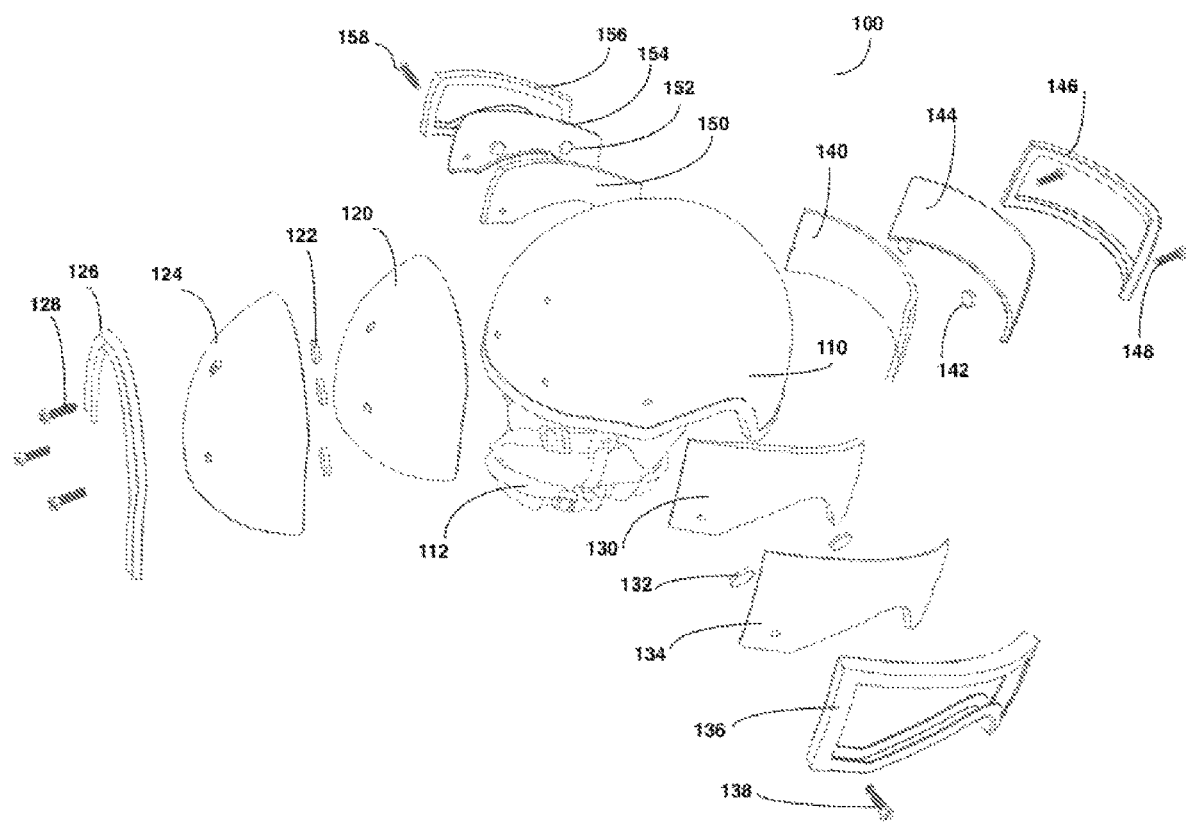
FIG. 4 illustrates an exploded view of the present invention depicting the armor plates oriented in one configuration around a ballistic helmet and the covering of the plates with the structural envelopes and optional frames and substrates.

FIG. 4 depicts an exploded view of one embodiment of the anti-ballistic protective headgear device 100 as described in the present disclosure. In the figure, one or more ceramic armor elements 120, 130, 140, 150 is fixedly placed on a helmet shell 110 having a helmet retention system/harness 112, in an overlay of interlocking geometrically compatible ceramic armor elements or plates. In one or more embodiments, the ceramic armor elements 120, 130, 140, 150 can be 3 to 10 sided.

In one or more embodiments, the ceramic armor elements 120, 130, 140, 150 may be covered by one or more structured envelopes 124, 134, 144, 154. In one or more embodiments, the one or more structured envelopes 124, 134, 144, 154 may be held in place by one or more frame elements 126, 136, 146, 156, which may be fixed to the assembly and/or helmet shell by adhesive or one or more fasteners 128, 138, 148, 158.

In one or more embodiments, the frame elements are primarily comprised of polymers, composite fibers, such as para-aramid, ultra-high molecular weight polyethylene, polypropylene, carbon fibers, metals and metal alloys and combinations thereof.

In one or more embodiments, metal to non-metal bonding may be accomplished using epoxy resin adhesives, polyester-based adhesives, polysulfides, and neoprene/rubber-based adhesives.

In another embodiment, the anti-ballistic protective headgear device 100 comprises one or more layers of substrate 122, 132, 142, 152 disposed in one or more locations selected from the group comprising (a) between the one or more ceramic armor elements and the one or more frame elements; (b) between the one or more ceramic armor elements and the outer surface of a ballistic helmet; or (c) between the ceramic armor elements and the structured envelopes.

In another embodiment, the one or more layers of substrate comprises metal, padding, rigid composite material, an impact-absorbing elastomer or combinations thereof.

In another embodiment, the ceramic armor tiles are shaped as interlocking geometrical shapes. In another embodiment, the ceramic armor tiles are shaped as a plurality of interlocking geometrical shapes, such plurality of solid plates being positioned in a single layer.

A study was conducted in order to evaluate the ballistic performance of an armor system incorporating the ceramic up-armor kit of the present invention.

The armor system tested included two ACH-style helmet shells made of para-aramid, which weighed approximately 2.8 pounds at a size Large. These were outfitted with frontal ceramic tiles, within a carbon fiber frame, as per the helmet depicted in FIG. 1, so that the total weight of the helmet system as-tested was 3.4 pounds. The ceramic tiles were attached to the helmet solely via the four bolts common to ACH-style combat helmets. The ceramic material utilized in the tiles was sintered silicon carbide, which has a density of 3.14 grams per cubic centimeter, and the tiles were 5 mm thick. The carbon fiber frame was of Toray T300, and was 0.5 mm thick.

The following munitions were used in the study.

5.56×45 mm M855
7.62×39 mm PS Ball
5.45×39 mm 7N10

Test 1, which was performed at a ballistics lab accredited by the National Institutes of Justice, evaluated the ballistic resistance of the system as well as its multi-hit performance. The system of the present invention was impacted on the front tile first by a 5.56×45 mm M855 round. Subsequently, the damaged tile was impacted by a 7.62×39 mm PS Ball round. Both impacts were defeated with no penetration.

Test 2, also performed at a ballistics lab accredited by the National Institutes of Justice, evaluated the ballistic resistance of the system against a different high-velocity steel-cored round. The system of the present invention was impacted on the front tile by a single 5.45×39 mm 7N10 round. The round was defeated with no penetration.

The 5.56×45 mm M855 round of the study weighed 62 grains, featured a steel penetrator hardened to approximately 45 HRC, and impacted the helmet system at 3061 feet per second. It was defeated with no penetration. Backface deformation—that is, deformation of the helmet shell—was measured, without pads, at 17.2 mm.

The 7.62×39 mm PS Ball round of the study weighed 123 grains, featured a mild steel core, and impacted the damaged, previously-struck helmet system at 2300 feet per second. It was defeated with no penetration. Backface deformation was measured, without pads, at 31.6 mm.

The 5.45×39 mm 7N6 round of the study weighed 56 grains, featured a steel core of undetermined hardness, and impacted the helmet system at 2862 feet per second. Backface deformation was measured without pads at 17.2 mm.

It should be noted, for comparison's sake, that should any of the aforementioned rounds strike a standard ACH-style para-aramid or ultra-high molecular weight polyethylene helmet, the rounds would penetrate the shell and exit out the opposite side—in effect penetrating the helmet twice.

"NIJ Level IIIA" refers to the U.S. National Institute of Justice (NIJ) ballistic standard for armor with the following capabilities: "This armor protects against 8.1 g (125 gr) .357 SIG FMJ Flat Nose (FN) bullets at a velocity of 448 m/s+−.9.1 m/s (1470 ft/s.+−.30 ft/s) and 15.6 g (240 gr) .44 Magnum Semi Jacketed Hollow Point (SJHP) bullets at a velocity of 436 m/s (1430 ft/s.+−0.30 ft/s). Conditioned armor protects against 8.1 g (125 gr) .357 SIG FMJ Flat Nose (FN) bullets at a velocity of 430 m/s.+−.9.1 m/s (1410 ft/s.+−0.30 ft/s) and 15.6 g (240 gr) .44 Magnum Semi Jacketed Hollow Point (SJHP) bullets at a velocity of 408 m/s.+−.9.1 m/s (1340 ft/s.+−0.30 ft/s). It also provides protection against most handgun threats, as well as the threats mentioned in NIJ Levels I, HA, and II. As used in this application, the term is also inclusive of the newer NIJ 0101.06 level of protection.

"NIJ Level III" refers to the NIJ ballistic standard for armor with the following capabilities: "This armor protects against 7.62 mm full metal jacketed (FMJ) bullets (U.S. military designation M80), with nominal masses of 9.6 g (148 gr), impacting at a minimum velocity of 838 m/s (2750 ft/s) or less. It also provides protection against Type I through III-A threats."

In order to achieve a NIJ level III, it is contemplated that plates of 0.6 cm thickness are located at the front and sides. In one embodiment, the helmet is 90% or more covered with 0.6 cm thick plates. In another embodiment, the crown of the helmet, which constitutes a low impact probability area, is uncovered by plates for purposes of weight reduction, resulting in approximately 80% or more of the helmet from the base of the shell to the crown being covered by plates.

In another preferred embodiment, there are about 50% 0.6 cm thick plates located in high impact probability areas, and about 50% 0.3 cm thick plates in remaining areas, percentages by surface area of the helmet. Percentages ranging from about 10% to about 90% of plates varying in thickness from about 0.3 cm to about 0.6 cm are also contemplated as within the present invention.

The plurality of variously-sized hard armor plates will be attached to the base shell helmet in an interlocking pattern to create a single layer of hard armor overlaying the shell. Attachment of the plates to the shell and to each other will be affected with a suitably durable polymer adhesive known in the art and having the proper bonding properties to adhere to both the hard armor plates and soft armor shell.

Adhesives contemplated as within the scope of the present invention include: cyanoacrylate adhesives, toughened acrylic adhesives, epoxy adhesives in one part, two part and film form, polyurethane adhesives, silicone adhesives in single or two-part forms, phenolic adhesives, polyimide adhesives, hot melt adhesives, plastisol adhesives, and rubber adhesives.

Although thermoset adhesives and flame curing are envisioned in one non-limiting embodiment, it is contemplated that chemical, UV light, and/or radiation cured adhesives may also be used.

Since one context in which the adhesive is used is attaching metal tiles to a polymeric helmet, the choice of adhesive may vary. In one or more embodiments, metal to non-metal bonding may be accomplished using epoxy resin adhesives, polyester-based adhesives, polysulfides, and neoprene/rubber-based adhesives.

In a preferred embodiment, the full helmet weight ranges from approximately 4 to 7.5 pounds. In a more preferred embodiment, the weight range is approximately 5 to 7 pounds.

In one or more embodiments, the combined impact resistant properties of the ceramic armor elements and structured envelope will meet or exceed NIJ Level III rating requirements.

Alternative embodiments

There are various possibilities with regard to tile size, configuration, and attachment. Although the drawings depict a preferred embodiment, numerous other possibilities come within the spirit and scope of the present invention. These include a ceramic-based appliqué kit that covers the front of the helmet only, a ceramic-based appliqué kit that covers the entire helmet in just two tiles, a ceramic-based appliqué kit that is held at an increased stand-off distance from the helmet shell, and a ceramic-based appliqué kit that is integral to the helmet shell, embedded within the helmet shell, or which lies underneath the helmet shell, among other possibilities.

In another embodiment, the hard armor plate(s) deformed or broken by a projectile impact will be removable and replaceable without the necessity of replacing the entire helmet.

It is also contemplated as within the scope of the invention, to provide the inventive helmet with additional components. Components include, without limitation, a ballistic face shield, a transparent face shield, a nape protector, a helmet cover, a ballistic neck protector, a transparent ballistic shield, pad and suspension kits, and one or more brackets or straps for additional equipment.

Advantages, Conclusion, and Scope.

The present invention thus provides an armor device that is capable of defeating threats up to and including hardened steel-core rifle rounds, adequately protects the most vulnerable areas of the head, can rapidly be removed when not needed, can support night vision and tactical equipment, and can be made to fit all common armor helmet designs such as, without limitation, the MICH, ACH, FAST.

As will be appreciated by one having ordinary skill in the art, the device of the present invention substantially reduces or eliminates the disadvantages and drawbacks associated with prior art devices for ballistic head protection.

It should be noted that, when employed in the present disclosure, the terms "comprises," "comprising," and other derivatives from the root term "comprise" are intended to be open-ended terms that specify the presence of any stated features, elements, steps, or components, and are not intended to preclude the presence or addition of one or more other features, elements, steps, components, or groups thereof.

While it is apparent that the illustrative embodiments of the invention herein disclosed fulfill the objectives of the present application, it will be appreciated that numerous modifications and other embodiments may be devised by one of ordinary skill in the art. Accordingly, it will be understood that the appended claims are intended to cover all such modifications and embodiments, which come within the spirit and scope of the present invention.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A modular ceramic armor applique assembly configured to form a ballistic shell for attachment to an outer-surface of a ballistic helmet, the modular ceramic armor applique assembly comprising:
   (a) one or more ceramic armor elements; and
   (b) one or more structured envelopes, and
   wherein the one or more ceramic armor elements are configured to attach to the outer surface of a ballistic helmet and to be held in place by the one or more structured envelopes;
   wherein the one or more structured envelopes are disposed to engage the one or more ceramic armor elements or outer surface structure of a ballistic helmet;
   wherein the modular ceramic armor applique assembly combined with the ballistic helmet provides protection from rifle-fired projectiles at muzzle velocity when the assembly is combined with a ballistic helmet and wherein the modular ceramic armor applique assembly comprises one or more layers of substrate disposed in one or more locations selected from a group comprising: (a) between the one or more ceramic armor elements and the one or more structured envelopes; (b) between the one or more ceramic armor elements and the outer surface of a ballistic helmet and (c) between the one or more ceramic armor elements and the inner surface of the ballistic shell.

2. The modular ceramic armor applique assembly of claim 1, wherein the one or more layers of substrate comprises metal, padding, rigid composite material, an impact-absorbing elastomer or combinations thereof.

3. The modular ceramic armor applique assembly of claim 1 wherein the ceramic armor elements are contained within one or more frames comprising (a) a metal selected from the group consisting of: aluminum, magnesium, iron, titanium, beryllium, nickel, and alloys and mixtures thereof; (b) a rigid composite material selected from the group consisting of: woven carbon fiber composites, unidirectional carbon fiber composites, woven aramid composites, unidirectional aramid composites, woven M5 fiber composites, unidirectional M5 fiber composites, woven polypropylene fiber composites, unidirectional polypropylene fiber composites woven e-glass composites, woven s-glass composites and mixtures thereof and (c) combinations thereof.

4. The modular ceramic armor applique assembly of claim 3, further comprising one or more layers of an impact-absorbing elastomer disposed between each ceramic armor element and the corresponding frame, and one or more layers of an impact-absorbing elastomer disposed between each ceramic armor element and the inner surface configured to engage an outer surface of a ballistic helmet.

5. The modular ceramic armor applique assembly of claim 3, wherein the frame is a woven fiber that envelops the one or more ceramic armor elements.

6. The modular ceramic armor applique assembly of claim 5, wherein the modular ceramic armor applique assembly attaches to the helmet shell's outer surface structure using one or more methods selected form the group consisting of metal screws or pins through small holes specially drilled into the modular ceramic armor applique assembly and the helmet, hook-and-loop fasteners such as Velcro, the four bolt holes common to military helmets, the bolt holes drilled into the front of ballistic helmets, often in a one-hole or three-hole pattern, and combinations thereof.

7. The modular ceramic armor applique assembly of claim 3, wherein the ceramic material is (a) one or more materials selected from the group consisting of silicon carbide, boron carbide, boron suboxide, aluminum oxide, silicon nitride, silicon boride, aluminum boride, magnesium boride, potassium boride, yttrium boride, calcium hexaboride, sodium boron carbide, magnesium silicide, aluminum magnesium boride, beryllium boride, titanium carbide, titanium boride, tungsten carbide, tungsten boride, polycrystalline boron, cubic boron nitride, polycrystalline diamond and combinations thereof (b) a ceramic-metal composite ("cermet") comprised of (i) a ceramic material selected from one or more of the following materials: silicon carbide, boron carbide, boron suboxide, aluminum oxide, silicon nitride, silicon boride, aluminum boride, magnesium boride, potassium boride, yttrium boride, calcium hexaboride, sodium boron carbide, magnesium silicide, aluminum magnesium boride, beryllium boride, titanium carbide, titanium boride, tungsten carbide, tungsten boride, polycrystalline boron, cubic boron nitride, and polycrystalline diamond; and (ii) a metal material selected from one or more of the following materials: silicon, aluminum, titanium, iron, magnesium, beryllium, scandium, chromium, zirconium, cobalt, nickel, germanium, molybdenum, copper, tungsten, manganese, and alloys of the aforementioned metals; and (c) combinations thereof.

8. The modular ceramic armor applique assembly of claim 3, wherein the ceramic material is a nanocomposite reinforced with boron nitride nanotubes, carbon nanotubes, graphene, or boron nitride nanosheets.

9. A ballistic helmet comprising a modular ceramic armor applique assembly according to claim 1 attached to an outer surface structure of the ballistic helmet.

10. The ballistic helmet of claim 9, wherein the ballistic helmet is primarily comprised of composite fibers, such as para-aramid, ultra-high molecular weight polyethylene, polypropylene, carbon fibers, metals and metal alloys and combinations thereof.

11. The ballistic helmet of claim 9, wherein the ceramic armor elements are contained within (a) one or more frames or envelopes, which are comprised of a metal selected from the group consisting of: aluminum, magnesium, iron, titanium, beryllium, nickel, and alloys and mixtures thereof; (c) one or more frames or envelopes, which are comprised of a rigid composite material selected from the group consisting of: woven carbon fiber composites, unidirectional carbon fiber composites, woven aramid composites, unidirectional aramid composites, woven M5 fiber composites, unidirectional M5 fiber composites, woven polypropylene fiber composites, unidirectional polypropylene fiber composites woven e-glass composites, woven s-glass composites and mixtures thereof; and (c) combinations thereof.

12. The ballistic helmet of claim 11, wherein the assembly attaches to the helmet shell using one or more method selected from the group consisting of (a) one or more metal screws, bolts, or fastening pins, through small holes specially drilled into the helmet; (b) Velcro; (c) the four bolt holes common to military helmets, typically utilized for the attachment of the helmet retention system or harness; and (d) bolt holes drilled into the front of the ballistic helmet also used to allow for the attachment of optics, night vision, and other tactical equipment to the helmet.

13. The ballistic helmet of claims 11, wherein the ceramic armor elements are 2 mm or greater in thickness.

14. The ballistic helmet of claims 11, wherein the woven fiber frame envelops the ceramic armor element.

15. The ballistic helmet of claim 11, wherein the ceramic material is (a) one or more materials selected from the group consisting of silicon carbide, boron carbide, boron suboxide, aluminum oxide, silicon nitride, silicon boride, aluminum boride, magnesium boride, potassium boride, yttrium boride, calcium hexaboride, sodium boron carbide, magnesium silicide, aluminum magnesium boride, beryllium boride, titanium carbide, titanium boride, tungsten carbide, tungsten boride, polycrystalline boron, cubic boron nitride, polycrystalline diamond and combinations thereof; (b) a ceramic-metal composite ("cermet") comprised of (i) a ceramic material selected from one or more of the following materials: silicon carbide, boron carbide, boron suboxide, aluminum oxide, silicon nitride, silicon boride, aluminum boride, magnesium boride, potassium boride, yttrium boride, calcium hexaboride, sodium boron carbide, magnesium silicide, aluminum magnesium boride, beryllium boride, titanium carbide, titanium boride, tungsten carbide, tungsten boride, polycrystalline boron, cubic boron nitride, and polycrystalline diamond; and (ii) a metal material selected from one or more of the following materials: silicon, aluminum, titanium, iron, magnesium, beryllium, scandium, chromium, zirconium, cobalt, nickel, germanium, molybdenum, copper, tungsten, manganese, and alloys of the aforementioned metals; and (c) combinations thereof.

16. The ballistic helmet of claim 11, wherein the ceramic material is a nanocomposite reinforced with boron nitride nanotubes, carbon nanotubes, graphene, or boron nitride nanosheets.

* * * * *